(12) United States Patent
Kent et al.

(10) Patent No.: US 8,279,194 B2
(45) Date of Patent: Oct. 2, 2012

(54) ELECTRODE CONFIGURATIONS FOR PROJECTED CAPACITIVE TOUCH SCREEN

(75) Inventors: Joel C. Kent, Fremont, CA (US); James L. Aroyan, Santa Cruz, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 561 days.

(21) Appl. No.: 12/471,194

(22) Filed: May 22, 2009

(65) Prior Publication Data

US 2010/0295814 A1 Nov. 25, 2010

(51) Int. Cl.
G06F 3/045 (2006.01)
(52) U.S. Cl. ............... 345/174; 345/168; 178/18.06
(58) Field of Classification Search .......... 345/168–174; 178/18.06
See application file for complete search history.

(56) References Cited

U.S. PATENT DOCUMENTS

| | | |
|---|---|---|
| 4,087,625 A | 5/1978 | Dym et al. |
| 4,103,252 A | 7/1978 | Bobick |
| 4,495,485 A | 1/1985 | Smith |
| 4,659,874 A | 4/1987 | Landmeier |
| 4,686,332 A | 8/1987 | Greanias et al. |
| 4,778,951 A | 10/1988 | Pepper, Jr. et al. |
| 4,954,823 A | 9/1990 | Binstead |
| 4,980,519 A | 12/1990 | Mathews |
| 4,999,462 A | 3/1991 | Purcell |
| 5,117,071 A | 5/1992 | Greanias et al. |
| 5,650,597 A | 7/1997 | Redmayne |
| 5,694,154 A | 12/1997 | Knox et al. |
| 5,844,506 A | 12/1998 | Binstead |
| 5,847,690 A | 12/1998 | Boie et al. |
| 6,288,707 B1 | 9/2001 | Philipp |
| 6,297,811 B1 * | 10/2001 | Kent et al. ..................... 345/173 |
| 6,537,150 B1 | 3/2003 | Luciano et al. |
| 6,787,715 B2 | 9/2004 | Chao et al. |
| 6,879,930 B2 | 4/2005 | Sinclair et al. |
| 7,218,124 B1 | 5/2007 | Mackey et al. |
| 2003/0067451 A1 | 4/2003 | Tagg et al. |

(Continued)

FOREIGN PATENT DOCUMENTS

EP 2045698 4/2009

(Continued)

OTHER PUBLICATIONS

International Preliminary Report on Patentability dated Dec. 1, 2011 for PCT/US2010/001321.

(Continued)

*Primary Examiner* — Amare Mengistu
*Assistant Examiner* — Premal Patel
(74) *Attorney, Agent, or Firm* — Alston & Bird LLP

(57) ABSTRACT

A projected capacitive touch screen is provided that comprises a substrate and electrodes. The substrate defines an active touch zone surrounded by edges. The active touch zone includes a central active zone and an acceleration zone that is located proximate to, and extends along, at least one of the edges. The electrodes are provided on the substrate and are organized into first and second sets of electrodes that are contained within a common plane on the substrate. The first set of electrodes is interlaced with the second set of electrodes in a non-overlapping pattern on the substrate. At least a subset of the electrodes each has an apex and a base and a non-uniform triangular shape that extends along a longitudinal axis between the apex and the base.

20 Claims, 7 Drawing Sheets

U.S. PATENT DOCUMENTS

| | | |
|---|---|---|
| 2006/0097991 A1 | 5/2006 | Hotelling et al. |
| 2006/0244732 A1 | 11/2006 | Geaghan |
| 2007/0247443 A1 | 10/2007 | Philipp |
| 2007/0257894 A1 | 11/2007 | Philipp |
| 2007/0279395 A1 | 12/2007 | Philipp et al. |
| 2008/0074398 A1 | 3/2008 | Wright |
| 2008/0246496 A1 | 10/2008 | Hristov et al. |
| 2008/0259044 A1 | 10/2008 | Utsunomiya et al. |
| 2009/0194344 A1 | 8/2009 | Harley et al. |
| 2009/0303231 A1* | 12/2009 | Robinet et al. ............... 345/419 |
| 2010/0000675 A1 | 1/2010 | Kim et al. |
| 2010/0001973 A1 | 1/2010 | Hotelling et al. |
| 2010/0051355 A1 | 3/2010 | Yang |
| 2010/0079393 A1 | 4/2010 | Dews |
| 2010/0295813 A1 | 11/2010 | Kent |
| 2011/0025636 A1 | 2/2011 | Ryu |
| 2011/0141051 A1 | 6/2011 | Ryu |

FOREIGN PATENT DOCUMENTS

| | | |
|---|---|---|
| WO | WO 88/05577 | 7/1988 |
| WO | WO-96/15464 | 5/1996 |

OTHER PUBLICATIONS

International Search Report of PCT/US2010/001321 (counterpart of U.S. Appl. No. 12/471,194).

* cited by examiner

ELECTRODE CONFIGURATIONS FOR PROJECTED CAPACITIVE TOUCH SCREEN

BACKGROUND OF THE INVENTION

Touch screens are well-established computer input devices. Uses of touch screens include point-of-sale applications like cash registers at fast-food restaurants, point-of-information applications such as department store information kiosks, and ticketing applications such as airline-ticket kiosks. As touch screen technologies mature, the range of applications increases including into portable handheld devices.

Commercially available touch screens utilize a variety of different touch detection mechanisms. One type of touch detection mechanism that appears to be well suited for handheld applications is based on a dielectric capacitive touch screen. Such systems are often referred to as projected capacitive touch screens since the detection mechanism involves projecting electric fields through a dielectric layer. "Projected capacitive" touchscreen is in contrast to a "surface capacitive" touchscreen that has a single sensing electrode covering the entire touch area. As used herein, "projected capacitive touchscreen" generalizes to any capacitive touchscreen with a plurality of sensing electrodes in the touch sensitive area. Projected capacitive touch screens provide better optical transmission and clarity than resistive touchscreens often used in handheld systems and yet provide good sensitivity to finger touches.

In one type of conventional projected capacitive sensors, one layer of horizontally oriented transparent electrodes plus a separate layer of vertically oriented transparent electrodes are required. The transparent electrodes are typically formed from thin films of ITO (indium tin oxide). Such projected capacitive sensors can provide excellent touch performance but manufacturing two layers of transparent electrodes adds cost.

Of commercial interest are projected capacitive sensor designs in which both horizontal and vertical coordinates are determined using a single plane of transparent electrodes. Such systems (for example as it FIG. 1) may provide touch performance of sufficient quality for many applications at a reduced cost.

FIG. 1 illustrates a conventional electrode configuration that has been proposed for a projected capacitive touch screen. In FIG. 1, electrodes 101-105 are formed of triangular regions of ITO or other transparent conductive film. Between electrodes 101-105 are insulating gaps often referred to as "deletion lines" as cost-effective manufacturing often starts with a glass substrate with a uniform ITO coating from which selected regions of ITO are removed to form the pattern of triangular electrodes 101-105. Each electrode 101-105 is electrically connected to the associated electronics, such as through metal traces indicated to the left of FIG. 1.

However, conventional capacitive touch screens have experienced certain limitations, particularly in small touch screens such as in handheld devices. For example, the conventional projected capacitive touch screens experience an effect referred to as edge deceleration. FIG. 2 illustrates the edge deceleration effect that may be experienced by a projected capacitive touch screen with a small touch sensitive area 110. FIG. 2 illustrates a finger moving along a line or trajectory 128 while in contact with the touch screen surface. Finger contact areas 122, 124 and 126 correspond to three different times during the finger motion along trajectory 128. For a well designed projected capacitive system, reconstructed (X,Y) touch coordinates 132 and 134 will be at the center of the corresponding touch contact areas 122 and 124. However, for touch contact area 126, the finger has partially left the touch sensitive area 110 and only the portion of the touch within touch sensitive area 110 is detected. This may result in reconstructed (X,Y) touch coordinates 136 which are not at the center of the touch contact area 126. Instead, the reconstructed (X,Y) touch coordinates are at an "effective center" which is at the center of the on-screen portion or detected touch contact area within the touch sensitive area 110. The trajectory 130 of reconstructed (X,Y) touch coordinates 136 may deviate from the true finger trajectory 128 near the edge of the touch area producing an artificial deceleration of the measured finger motion velocity component that is perpendicular to the edge of the touch sensitive area 110.

A need remains for electrode configurations and geometries that compensate for various effects such as the deceleration effect.

BRIEF DESCRIPTION OF THE INVENTION

In accordance with an embodiment, a projected capacitive touch screen is provided that comprises a substrate and electrodes. The substrate defines an active touch zone surrounded by edges. The active touch zone includes a central active zone and an acceleration zone that is located proximate to, and extends along, at least one of the edges. The electrodes are provided on the substrate and are organized into first and second sets of electrodes that are contained within a common plane on the substrate. The first set of electrodes is interlaced with the second set of electrodes in a non-overlapping pattern on the substrate. At least a subset of the electrodes each has an apex and a base and a non-uniform triangular shape that extends along a longitudinal axis between the apex and the base. The subset of the electrodes is located such that at least a portion of the non-uniform triangular shape is located within the acceleration zone.

In accordance with an embodiment, a projected capacitive touch screen is provided that comprises a substrate and electrodes. The substrate defines an active touch zone surrounded by edges. The active touch zone includes a central active zone and an acceleration zone that is located proximate to, and extends along, at least one of the edges. The electrodes are provided on the substrate and are organized into first and second sets of electrodes that are contained within a common plane on the substrate. The first set of electrodes is interlaced with the second set of electrodes in a non-overlapping pattern on the substrate. At least a subset of the electrodes each has opposed non-parallel first and second sides. The subset of the electrodes each has an apex segment, a base segment and an intermediate body segment therebetween, wherein the first side has a first pitch in the intermediate segment and a second pitch in at least one of the apex and base segments. The subset of the electrodes is located such that at least one of the apex and base segments is located within the acceleration zone.

In accordance with an embodiment, an electronic device is provided that comprises a processor, memory storing instructions to control operation of the processor, and a display for presenting information to a user. The display includes a projected capacitive touch screen that comprises a substrate and electrodes. The substrate defines an active touch zone surrounded by edges. The active touch zone includes a central active zone and an acceleration zone that is located proximate to, and extends along, at least one of the edges. The electrodes are provided on the substrate and are organized into first and second sets of electrodes that are contained within a common plane on the substrate. The first set of electrodes is interlaced with the second set of electrodes in a non-overlapping pattern on the substrate. At least a subset of the electrodes each has an apex and a base and a non-uniform triangular shape that extends along a longitudinal axis between the apex and the base. The subset of the electrodes is located such that at least a portion of the non-uniform triangular shape is located within the acceleration zone.

The non-uniform triangular shape may be formed in part by varying an electrode width more rapidly near a perimeter of the active touch zone than the variation of the electrode width near a center of the active touch zone. The non-uniform triangular shape and non-overlapping pattern provide edge acceleration to compensate for signal loss when a portion of a finger contact area moves beyond the edge outside of the active touch zone. The non-uniform triangular shape may include a first pitch proximate to the base and a second pitch proximate to the apex. The pitch represents a rate of change in a width of the electrode per unit of distance along the longitudinal axis of the electrode.

DETAILED DESCRIPTION OF THE INVENTION

Figure 3:
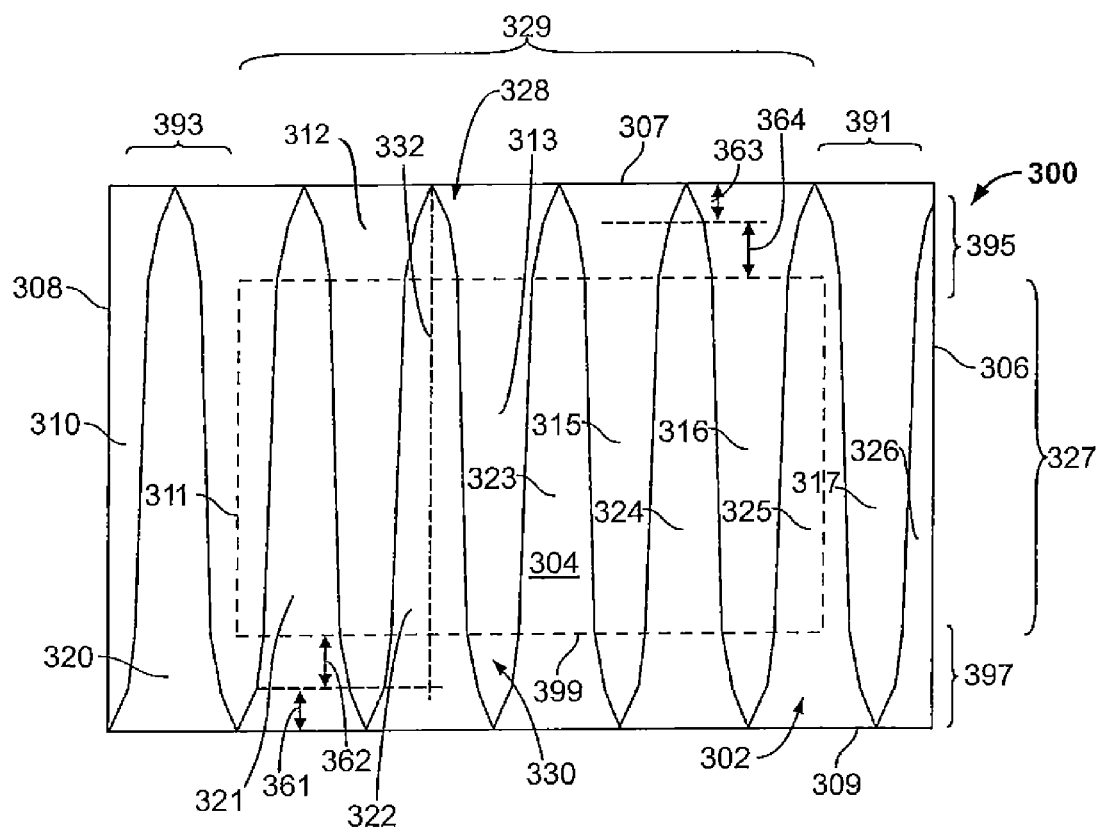
FIG. 3 illustrates a projected capacitive touch screen formed in accordance with an embodiment.

FIG. 3 illustrates a projected capacitive touch screen 300 that comprises a substrate 302 that defines an active touch zone 304 surrounded by edges 306-309. The edges 306-309 include lateral edges 306 and 308 that are located opposite one another on opposite sides of the active touch zone 304 and longitudinal edges 307 and 309 that are located opposite one another at the top and bottom of the active touch zone 304. It should be recognized that the touch screen 300 operates in any orientation and that the terms "longitudinal", "lateral", "side", "top" and "bottom" are for descriptive purposes only. The touch screen 300 also includes a plurality of electrodes 310-326 provided on the substrate 302. The electrodes 310-326 are organized into a first set 310-317 and a second set 320-326, where both the first and second sets 310-317 and 320-326 are both contained within a common plane on the substrate 302. Each of the electrodes 310-326 is electrically isolated from its nearest neighbors by deletion lines (as discussed above). The electrodes from the first set 310-317 are interlaced with the electrodes from the second set 320-326 in a non-overlapping pattern on the substrate 302 that generally represents a backgammon type of pattern.

Each of the electrodes 310-326 has an apex 328 and a base 330. Each of the electrodes 310-326 is elongated to extend along a longitudinal axis 332 between the apex 328 and the base 330. The longitudinal axes 332 of the electrodes 310-326 are oriented to extend in a common direction as opposed lateral edges 306 and 308. All of the electrodes 310-326, or at least a subset of the electrodes 310-326, have a non-uniform triangular shape or geometry, examples and the details of which are discussed below. The non-uniform triangular shape provides a desired "hardware edge acceleration" effect to compensate for the inherent edge deceleration effect discussed in connection with FIG. 2. The non-uniform triangular shape and non-overlapping pattern provide edge acceleration to compensate for signal loss when a portion of a finger contact area moves beyond the edges 306-309 outside the active touch zone 304. The electrodes 310-326 include first and second subsets. The first subset includes electrodes 310 and 320 that extend along the acceleration zone 393 proximate the edge 308. The first subset also includes electrodes 317 and 326 that extend along the acceleration zone 391 proximate the edge 306. The second subset of electrodes 311-316 and 321-325 extends through the central active zone 399. Optionally, the one or both of the first and second subsets may include only a single electrode. The electrodes 310, 320, 317 and 326 in the first subset have a smaller electrode area than an electrode area of the electrodes 311-316 and 321-325 in the second subset. Exemplary differences in electrode area are discussed below in more detail in connection with FIG. 5.

Figure 1:
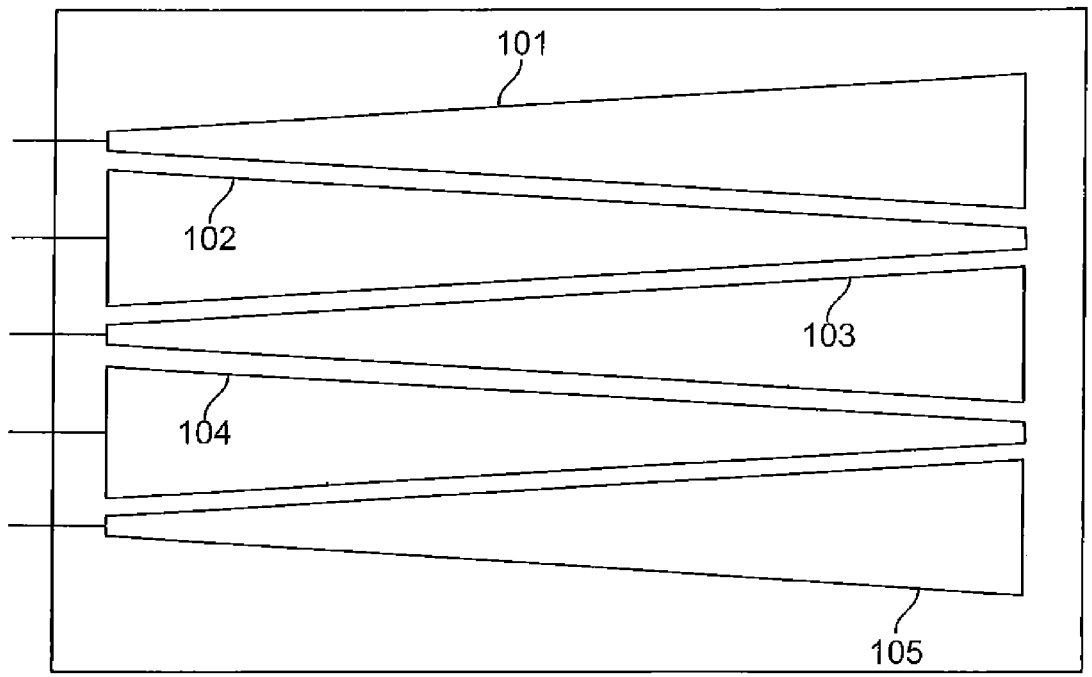
FIG. 1 illustrates a conventional electrode configuration that has been proposed for a projected capacitive touch screen.
Figure 2:
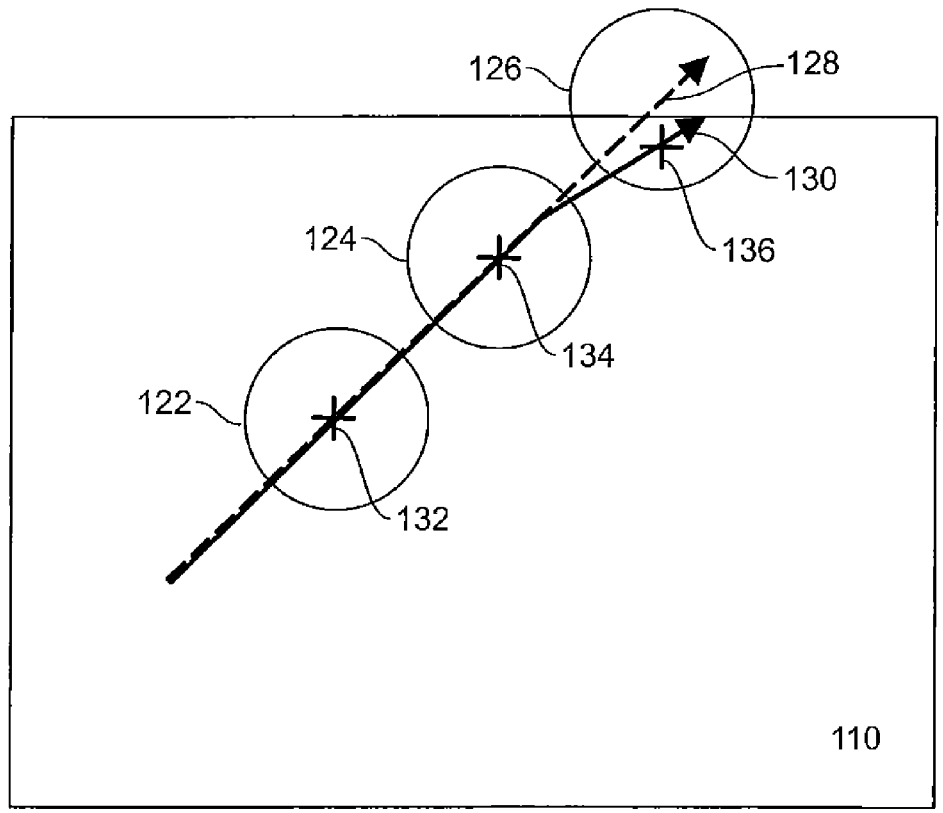
FIG. 2 illustrates an edge deceleration effect that may be experienced by a projected capacitive touch screen with a small touch sensitive area.

An acceleration zone differs from the central active zone in that at least a portion of the acceleration zone provides hardware edge acceleration while no hardware edge acceleration is present in the central active zone. The features of electrode design that produce hardware edge acceleration are illustrated in the figures. To produce the desired compensation for the edge deceleration effect illustrated in FIG. 2, hardware edge acceleration, not hardware deceleration, is required within the acceleration zone. Hardware acceleration is excluded or substantially absent from the central active zone where the edge deceleration effect of FIG. 2 is not present, as is desired to maintain the desired linear relationship between true and measured touch positions.

The active touch zone 304 includes a central active zone 399 as denoted in dashed line. The central active zone 399 extends in the longitudinal direction 327 and in the lateral direction 329. The active touch zone 304 includes acceleration zones 391, 393, 395 and 397 that are located proximate to, and extend along, corresponding edges 306, 308, 397 and 309, respectively. The central active zone 399 is surrounded by the acceleration zones 391, 393, 395 and 397. The electrodes 310, 320, and 311 represent a subset of electrodes that are at least partially within, and that extend along, the acceleration zone 393 proximate to the edge 308. The electrodes 325, 317 and 326 represent a subset of electrodes that are at least partially within, and that extend along, the acceleration zone 391 proximate to the edge 306. The electrodes 311-316, 321-325 represent a subset of electrodes that are at least partially within, and that extend through, the central active zone such that the apexes 328 and bases 330 are located in opposed acceleration zones 395 and 397.

Figure 4A:
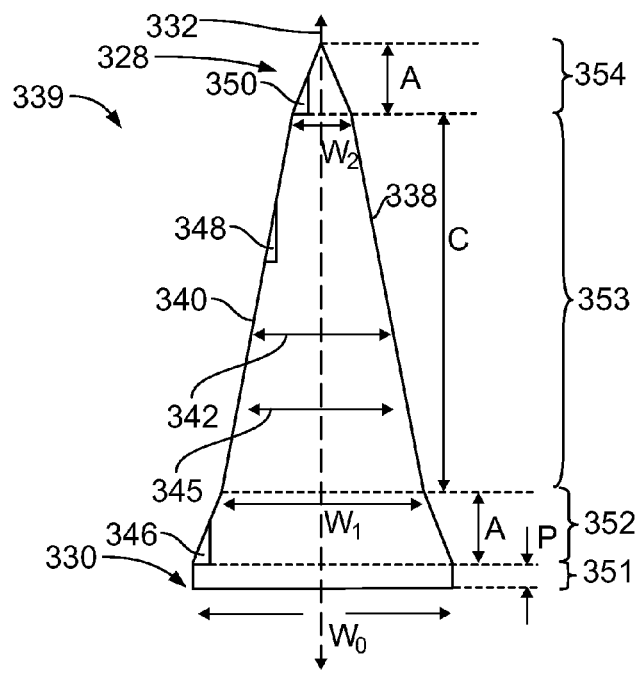
FIG. 4A illustrates an expanded view of one electrode to better illustrate a non-uniform triangular shape formed in accordance with one embodiment.

FIG. 4A illustrates an expanded view of one electrode 339 to better illustrate one embodiment of a non-uniform triangular shape or geometry. The electrode 339 in FIG. 4A includes an apex 328, a base 330 and a longitudinal axis 332 extending along a length of the electrode 339. The electrode 339 includes an electrode width, such as W0, W1 and W2, that may be measured at various points along the length of the electrode 339. The electrode width (generally denoted at 342) represents a local width of the electrode 339 between electrode sides 338 and 340 as measured in a lateral direction 345 perpendicular to the longitudinal axis 332. The non-uniform triangular shape is defined by multiple electrode widths that vary continuously at different points along the electrode 339.

In the example of FIG. 4A, the electrode 339 is apportioned into foundation segment 351, base segment 352, intermediate body segment 353 and apex segment 354. The electrode 339 has opposed non-parallel sides 338 and 340 that extend between apex 328 and base 330. The segments 351-354 are differentiated from one another in that the pitch along one or both of the sides 338 and 340 changes between each of the segments 351-354. The pitch represents a rate of change in the electrode width 342 per unit of distance along the length of longitudinal axis 332 of the electrode 339.

The non-uniform triangular shape includes a first pitch 346 along a base segment 352 proximate to the base 330, a second pitch 348 along the intermediate body segment 353 and a third pitch 350 along the apex segment 354 proximate to the apex 328. Pitch is defined with respect to the longitudinal axis 332, namely pitch represents the change in lateral distance from longitudinal axis 332 per unit distance along longitudinal axis 332. An intra-electrode pitch changes (e.g., the pitch at different points along the electrode sides 338 and 340) such that the pitches 346 and 350 are the same, while pitch 348 differs from the pitches 346 and 350. By way of example, the pitch 348 is decreased in rate relative to the pitches 346 and 350 when progressing from the intermediate body segment 353 towards an edge, namely to base 330 when progressing towards bottom edge 309 or to the apex 328 when progressing towards top edge 307. For example, as illustrated in FIG. 4A, the pitches 350 and 346 are the same and both are greater than the pitch 348. Optionally, one or more of the pitches 346, 348 and 350 along opposite sides 338 and 340 may differ. For example, the pitch along side 338 in segment 353 may differ from the pitch along side 340 in the same segment 353. The segments 351-354 are formed contiguous with one another from a common base material, but may be conceptually considered distinct notional components having different size and with different pitches. Alternatively, the non-uniform triangular shape may be considered to comprise a stack of trapezoids where the trapezoid nearest the apex 328 (e.g., apex segment 354) has a mid-point width that is less than a mid-point width of the trapezoid nearest the base 330 (e.g., base segment 352).

The horizontal distance between left and right edges of electrodes 310-326 varies with height. This variation becomes more rapid as the top and bottom edges 307, 309 are approached. The more rapid the height variation of the electrode width, the more rapidly the fraction of the touch signal in the odd numbered electrodes increases as a function of touch position height, and hence a more rapid variation near the edges 307, 309 provides a degree of hardware edge acceleration to compensate for the edge deceleration effect. There are many choices for the detailed geometry providing a more rapid height variation of electrode width including straight-line segments of electrode perimeter in vertical regions, fewer or more such segments, as well as convex curved electrode outlines near the electrode apex 328 and matching concave curved electrode outlines near the electrode base 330.

In the example of FIG. 4A, the electrode 339 is formed with four segments 351-354 with pitch changes therebetween. Optionally, the number of segments with different pitch may be fewer or more. For example, returning to FIG. 3, each of the electrodes 310-326 has two segments 363 and 364 with different pitch at the apex 328 and two segments 361 and 362 with different pitch at the base 330.

Figure 4B:
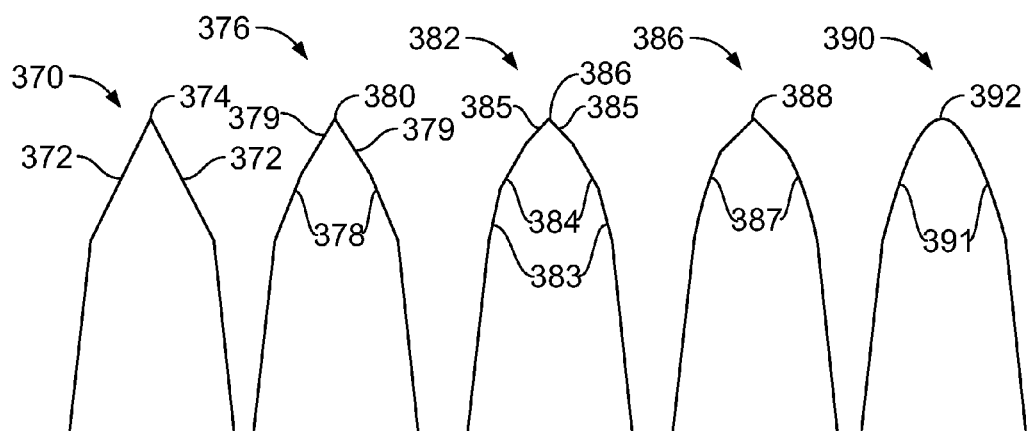
FIG. 4B illustrates alternative geometries that may be utilized in the apex segment of electrodes in accordance with alternative embodiments.

FIG. 4B illustrates alternative geometries that may be utilized in the apex segment of electrodes in accordance with alternative embodiments. In FIG. 4B, apex segment 370 includes a triangular contour with a pair of linear edge segments 372 that converge at point 374. Apex segment 376 includes multiple pairs of linear edge segments 378 and 379 that converge at a point 380. Apex segment 382 includes multiple pairs of linear edge segments 383, 384 and 385 that converge at a point 386. Apex segment 386 includes a pair of rounded edge segments 387 forming a concave interior contour that converges to a point 388. Apex segment 390 includes a pair of rounded edges 391 that have a concave interior surface that meet at a concave end 392.

Figure 5:
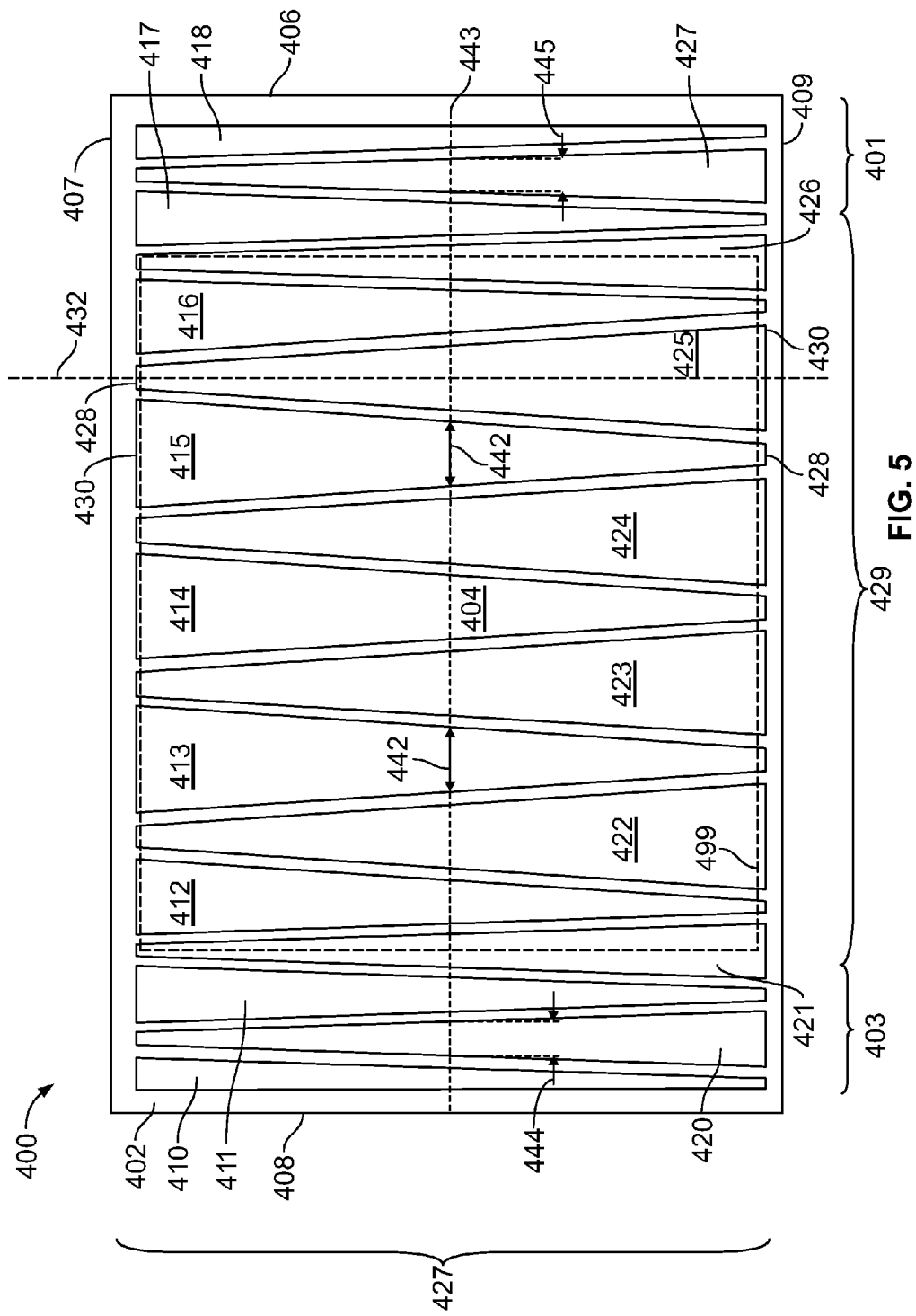
FIG. 5 illustrates an electrode configuration with inter-electrode pitch differences formed in accordance with an alternative embodiment.

FIG. 5 illustrates an electrode configuration with different electrode widths that may be used in accordance with an embodiment. FIG. 5 illustrates a projected capacitive touch screen 400 that comprises a substrate 402 that defines an active touch zone 404 surrounded by edges 406-409. The edges 406-409 include lateral edges 406 and 408 that are located opposite one another on opposite sides of the active touch zone 404, and longitudinal edges 407 and 409 are located opposite one another at the top and bottom of the active touch zone 404. The active touch zone 404 includes a central active zone 499 spanning in the longitudinal direction by 427 and in the lateral direction by 429. The electrodes 410-427 are organized into a first set 410-418 and a second set 420-427, where both the first and second sets 410-418 and 420-427 are all contained within a common plane on the substrate 402. The electrodes from the first set 420-428 are interlaced with the electrodes from the second set 410-418 in a non-overlapping pattern on the substrate 402 that generally represents a backgammon type of pattern.

Each of the electrodes 410-428 has an apex 428 and a base 430. Each of the electrodes 410-418 is elongated to extend along a longitudinal axis 432 between the apex 428 and the base 430. To avoid overly complicating FIG. 5, only one longitudinal axis 432 is denoted. The longitudinal axes 432 of the electrodes 410-418 are oriented to extend in a common direction as opposed lateral edges 406, 408. All of the electrodes 410-418 and 420-427, or at least a subset of the electrodes 410-418 and 420-427 have a non-uniform triangular shape or geometry.

The active touch zone 404 includes lateral acceleration zones 401 and 403 that are located proximate to, and extend along, corresponding lateral edges 406 and 408, respectively. The central active zone 499 extends to the longitudinal edges 407 and 409 of the substrate 402. The electrodes 410, 411, 420 and 421 represent a subset that is wholly or at least partially within, and extends along, the acceleration zone 403 proximate to the edge 408. For example, electrode 410 is located entirely within the acceleration zone 403, while electrode 421 is located only partially within the acceleration zone 403. The electrodes 417, 418, 426, and 427 represent a subset that is at least partially within, and extends along, the acceleration zone 401 proximate to the edge 406. The electrodes 412-416 and 421-426 represent a subset that is entirely or at least partially within, and extends through, the central active zone 499 between the longitudinal edges 407 and 409.

For visual simplicity, FIG. 5 is drawn to illustrate triangles of uniform pitch but with non-uniformity in width to illustrate acceleration zones 401 and 403 proximate to edges 406 and 408. However, in at least certain applications, designs with non-uniform pitch as in FIGS. 3, 4A and 4B may be provided to afford acceleration on all sides. It should also be noted that in many design practices the number of triangles will be much larger and the width of the triangular electrodes will be much narrower that shown in the figures. Generally, electrode widths should be small compared to the size of a contact area of a finger tip or other touch instrument.

The electrode widths or pitches of at least a portion of the electrodes 410-418 and 420-427 shown in FIG. 5 vary from one another. For example, the electrodes 413-415 and 422-425 have a common combination of pitches and a similar variation in electrode widths 442 as measured at the center longitudinal line 443, while electrodes 410-412, 416-418, 420-421, 426-427 near the left edge 408 and the right edge 406 are increasingly narrower in pitch and electrode width. For example, the electrode width 444 of electrode 420 and the electrode width 445 of electrode 427 at central longitudinal line 443 are less than the electrode width 442 of the central electrodes 413-415 at central longitudinal line 443. Similarly, the electrode width of the electrodes 427 and 420 at any longitudinal line across the substrate 402 are less than the electrode width of the electrodes 422-425 at the same common longitudinal line.

The surface area of the electrodes is a function of a spacing of the electrodes from the lateral edges 406 and 408. The electrodes 413-415 and 422-425 have a common surface area, referred to hereafter as electrode area. Optionally, a portion of the electrodes that extend through the central active zone 499 may have different electrode areas. For example, while electrodes 412-416 and 422-425 are all at least partially within the central active zone 499, they do not all have the same electrode area. Instead, the electrodes 412 and 416 have a single common electrode area, yet the electrode area of each of the electrodes 412 and 416 is less than the electrode area of each of the electrodes 413-415. The electrodes 411 and 417 have the same electrode area which is less than the electrode area of the electrodes 412 and 416. The electrode area of the electrodes 420 and 427 is the same but less than the electrode area of the electrodes 422-425.

Optionally, the surface area of each electrode may be a function of the position or number of the electrode from the lateral edges 406 and 408. For example, the first electrodes in from the edges 408 and 406 may have the least surface area, while the second electrodes in from the edges 408 and 406 may have slightly larger surface area. The surface area of the electrodes may be the greatest in the center and progressively decrease for the electrodes located nearer and nearer the edges 406 and 408.

The choice of electrode widths depends on a number of criteria such as the typical contact area of touches, and the desired degree of edge acceleration desired to compensate for the edge deceleration effect. It is generally desirable for the electrode widths to decrease in the region proximate to the touch area edges. The change in electrode width may be an abrupt change from a larger electrode width to a smaller electrode width. Alternatively, the change in electrode width may be a linear decrease from electrode to electrode as a function of number of the electrode from the edge. Other schemes may also be used for monotonically decreasing electrode width as the edge is approached.

Edge acceleration results from the decrease in electrode width or area in the acceleration zone relative to the central active zone 499. For example, with a conventional algorithm in which the computed horizontal coordinate is effectively computed as a signal weighted electrode sequence number, the rate that the computed coordinate changes per unit horizontal movement of a finger touch is inversely proportional to the electrode width of areas. By reducing electrode areas in acceleration zones 401 and 403 one increases the rate that the computed horizontal coordinate changes as a function of finger motion, hence providing edge acceleration. For a horizontal coordinate estimate based on the sequence numbers of electrodes or electronic channels detecting a touch signal, a more rapid change in electrode or electronic channel number per physical unit of distance results in edge acceleration of the computed coordinate.

Reducing electrode widths as in FIG. 5 provides for hardware acceleration to compensate for the edge deceleration for two of the four edges of the active touch zone 404, namely along the lateral edges 406 and 408. Optionally, one or more of the electrode geometries of FIGS. 3, 4A and 4B may be combined with the variation in inter-electrode widths of FIG. 5 to provide hardware edge acceleration on all four edges 406-409.

Edge deceleration (as discussed above in connection with FIG. 2) is limited to a perimeter region of the active touch zone. The width of the perimeter (acceleration zone) is based, at least in part, on an estimated size of the finger contact area expected to touch the touch screen. For a typical application, the finger contact area may typically have a diameter of up to 20 mm. Thus, the edge deceleration is limited to a region within 20 mm of the edges of the active touch zone. The hardware edge acceleration compensation methods discussed above in connection with FIGS. 3-5 may be similarly limited to a region up to 20 mm from the edges of the active touch zone. For example, the electrodes of narrowed width in FIG. 5 may all be located within 20 mm of the lateral edges 406 and 408. The apex and base segments may be sized such that the heights of the apex and base segments are up to 20 mm in length to span the width of the longitudinal acceleration zones 395, 397. For some applications, particularly where finger touches tend to have a smaller touch contact area, hardware edge acceleration may be limited to a region less than or equal to 10 mm from the edges. Optionally, for other applications, edge acceleration zones as small as 5 mm in width may be sufficient. Furthermore, hardware edge acceleration may be combined with software edge correction algorithms. If the stylus activating the touchscreen is something bigger than a finger, say a palm or a foot, larger edge acceleration zones may be of interest.

Optionally, the central active zone 399 need not be centered in the active touch zone 304. For example, the top, bottom and left acceleration zones 395, 397 and 393 may be provided, but no acceleration zone 391 may be provided along the right edge. Alternatively, top, right and left acceleration zones 395, 391 and 393 may be provided, but no acceleration zone 397 may be provided along the bottom edge. Alternatively, a width of one or more of the acceleration zones 391, 393, 395 and 397 may differ from one another. For example, the left acceleration zone 393 may be wider (as measured laterally from the edge 308) than a width of the right acceleration zone 391 (as measured laterally from the edge 306). Alternatively, the top and bottom acceleration zones 395 and 397 may be wider (as measured longitudinally from the edges 307 and 309) than a width of the right and left acceleration zones 391 and 393 (as measured laterally from the edges 306 and 308).

The hardware edge acceleration electrode configurations discussed in connection with FIGS. 3-5 may be electrically coupled together in numerous different groups of common electrodes. The electrodes may be grouped to enable the number of electrodes to greatly exceed the number of electronic channels that are separately processed by the touch screen electronics. When a limited number of electronic channels are available, using more electrodes than the number of channels improves the performance of the projected capacitive touch screen.

Figure 6:
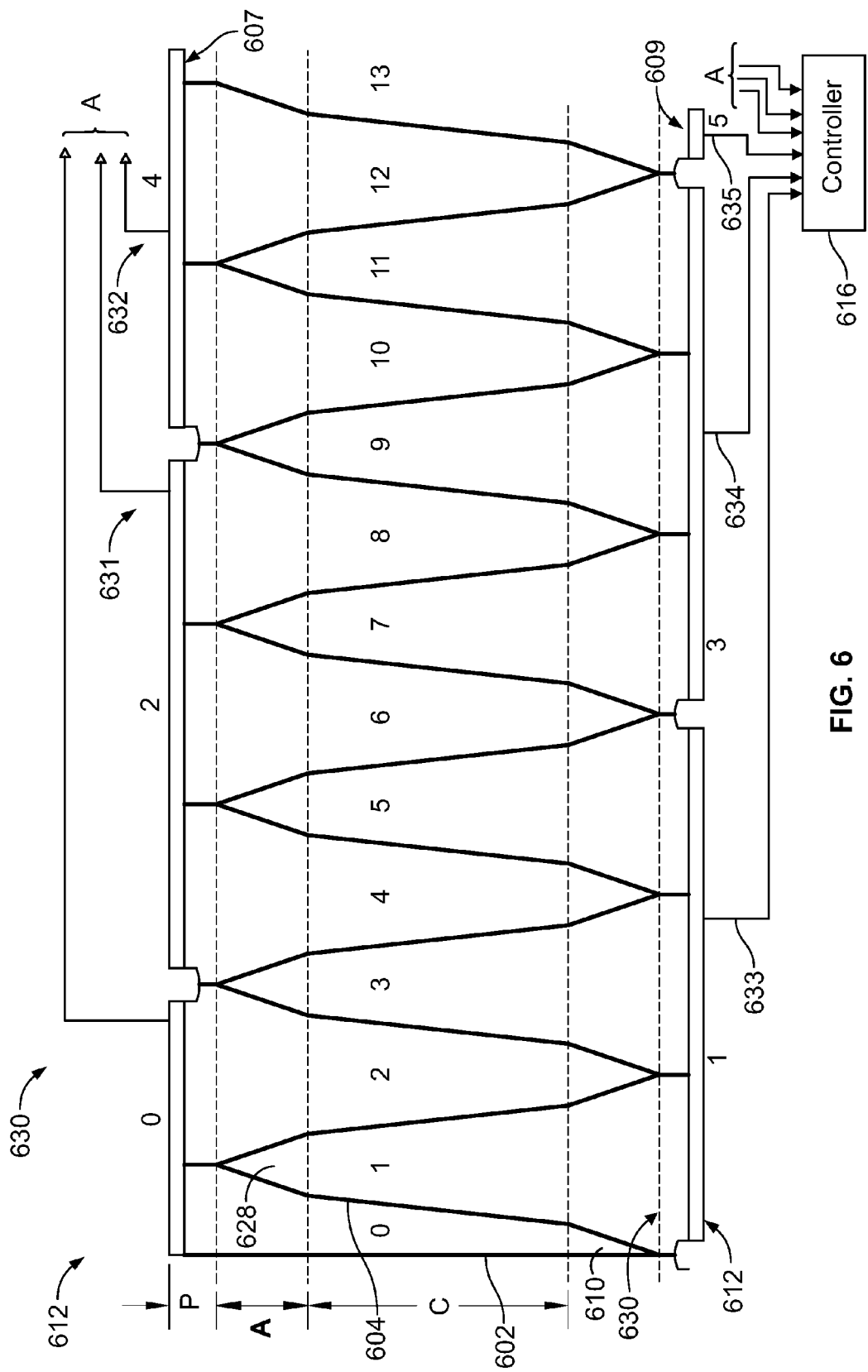
FIG. 6 illustrates a portion of a projected capacitive touch screen with electrode to contact groupings in accordance with one embodiment.

FIG. 6 illustrates a portion of a capacitive touch screen 600 with electrodes grouped in accordance with one embodiment. The electrodes 610 are numbered #0 to #13 and are physically and electrically separated from adjacent electrodes at gaps 604. The substrate 602 may be glass, a polymer film such as polyethylene terephthalate (PET), or other suitable material. Each of the electrodes 610 may be formed from a deposited conductive coating that may be deposited in a desired pattern, such as by using screen printing, photographic, or other process. In another embodiment, the conductive coating may be deposited to evenly and completely cover a surface of the substrate 602. Portions of the conductive coating may then be removed to form the triangular-shaped electrodes 610. The transparent conductive coating may be indium tin oxide (ITO), antimony tin oxide (ATO), a fluorine-doped tin oxide, a carbon-nanotube containing film, a silver nano-wire containing film, an intrinsically conductive polymer, and the like. In yet another embodiment each of the electrodes 610 may be formed by forming a serpentine pattern using fine metal wires to fill in an outline of each triangle such as described in U.S. Pat. No. 6,297,811, the complete subject matter of which is incorporated herein by reference. The wires may be, for example, between ten and twenty-five micrometers thick.

The substrate 602 includes an array of contacts 612 provided on opposite longitudinal edges 607 and 609. The contacts 612 are numbered #0 to #5 with the odd numbered contacts located along edge 609 and the evenly numbered contacts located along edge 607. The electrodes 610 include an apex 628 and a base 630. The bases 630 are electrically connected to corresponding contacts 612. In the exemplary embodiment, electrodes #1, #3, and #5 include bases 630 that are connected to contact #1, while electrodes #0, and #2 include bases 630 that are connected to contact #0. The bases 630 of electrodes #4, #6 and #8 are connected to contact #2, while the bases 630 of electrodes #7, #9 and #11 are connected to contact #3. In the present example, two or three electrodes 610 are connected to a common contact 612. Optionally, a single electrode 610 may be connected in a one to one relation to a contact 612. Alternatively, larger groups of electrodes 610 may be connected to a single contact 612.

The contacts 612 are connected to traces 630-635 that provide the sensed signals for the group of corresponding electrodes 612 to the controller 616. In one embodiment, traces 630-635 may be formed from materials such as the conductive wire, silver-frit, deposited metal films, conductive-ink, incomplete deletion-line separation of the conductive coating, and the like, to electrically join electrodes 610 into groups on the substrate 602. The traces 630-635 may also convey signals and power between individual electrodes 610 and a cable or cable connector and/or the groups of electrodes and the cable or cable connector.

As used herein, the term "adjacent electrodes" refers to nearest-neighbor electrodes that are next to each other. For ease of description, adjacent electrodes are numbered sequentially. For example, electrodes #1 and #2 are adjacent electrodes, and electrodes #4 and #5 are adjacent electrodes. The orientation of adjacent electrodes #0 to #13 is reversed or alternating with respect to each other, forming an interleaved arrangement. For example, the base 630 of the electrode #3 is positioned adjacent to apex 628 of the adjacent electrodes #2 and #4. A first set of odd-numbered electrodes #1, #3, #5, #7, #9, #11 and #13 has an orientation wherein the bases 630 of the odd-numbered electrodes are all proximate the same edge, for example edge 609 of the substrate 602. A second set of even-numbered electrodes #0, #2, #4, #6, #8, #10, and #12 has an opposite orientation compared to the orientation of the odd-numbered electrodes, wherein the bases 630 of the even-numbered electrodes are proximate the edge 607 of the substrate 122.

As used herein, the term "semi-adjacent electrodes" refers to nearest-neighbor electrodes that have the same orientation. For example, electrodes #5 and #7 are semi-adjacent electrodes and electrodes #8 and #10 are semi-adjacent electrodes. Each of the traces 633 through 635 forms a capacitance measuring electronic channel that is connected to a controller 616 and a set of semi-adjacent electrodes. For example, semi-adjacent electrodes #1, #3, and #5 are joined at contact #1 to provide a sensed signal over one channel (e.g. at trace 633). It should be understood that for a given number of electronic channels, such as twelve electronic channels, the touch screen may include many more electrodes than are shown, thus providing more linear position measurements and/or a larger size touch screen.

Figure 7:
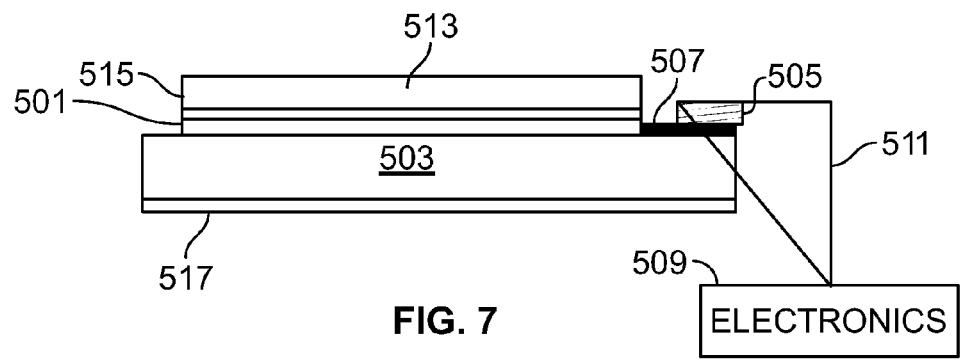
FIG. 7 illustrates a touch screen cross-section in accordance with an embodiment.

A variety of touch screen cross-sections can be used with the present invention. For example, as illustrated in FIG. 7, a plurality of electrodes 501 may be attached to a substrate 503. Electrodes 501 are coupled through interconnect traces 507 and a connection 505, such as an anisotropic conductive film (ACF) adhesive bond, to a flexible cable 511. The flexible cable 511 in turn is coupled to touch screen electronics 509. Touch surface 513 may be of any dielectric material, such as glass, a polymer (e.g. polycarbonate). Touch surface 513 can even be designed for easy replacement for applications in which the touch surface is subject to significant wear or abuse, preferably transparent in typical applications with a display behind the touchscreen. In any case touch surface 513 can be mechanically coupled to the electrode array, for example with an adhesive layer 515. Optionally, a guard electrode 517 can be deposited on the bottom surface of substrate 503 to minimize the effects of stray capacitances between the sense electrodes and, for example, a display device placed behind the touch screen. Optionally, a perimeter guard electrode can be provided in the plane of the sense electrodes to minimize the effects of stray capacitances to objects around the perimeter of the touch screen, e.g., metal associated with the bezel and its supporting structures.

Figure 8:
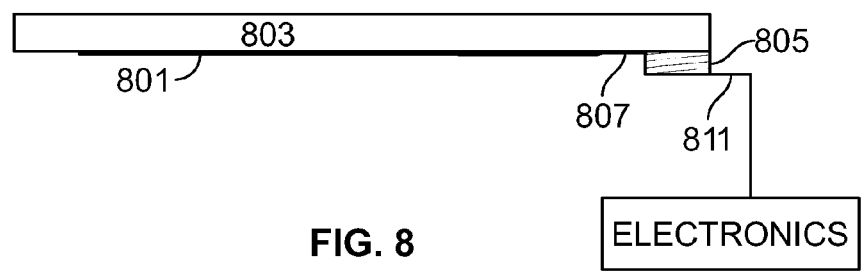
FIG. 8 illustrates a touch screen cross-section in accordance with another embodiment.

In an alternate configuration shown in FIG. 8, substrate 803 serves as a touch surface and electrodes 801 are fabricated on the bottom or interior surface of substrate 803. Electrodes 801 connect to electronics via conductive traces 807, anisotropic adhesive film bond 805 and flexible cable 811. This simple construct is of interest to applications requiring low cost designs.

Figure 9:
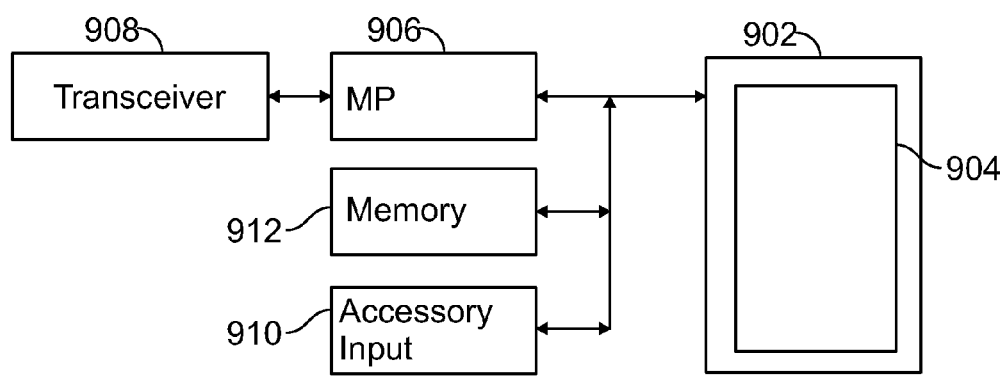
FIG. 9 illustrates an electronic system that implements a projected capacitive touch screen in accordance with an embodiment.

FIG. 9 illustrates an electronic system that implements a projected capacitive touch screen in accordance with an embodiment herein. The electronic system 900 may be embodied within a portable device or a stationary apparatus. The electronic system may constitute a cellular phone, a satellite navigation device, a portable computer, a video game, a personal digital assistant, a patient monitor, a workstation for a medical diagnostic imaging device and the like. The electronic system 900 includes a display 902 that has a projected capacitive touch screen 904, a processor 906, a transceiver 908, an accessory input 910 and memory 912. The memory 912 stores instructions to control the processor, outputs to the user, inputs from the user, inputs from accessories (e.g., ECG leads, a medical scanning device) and the like.

Figure 10:
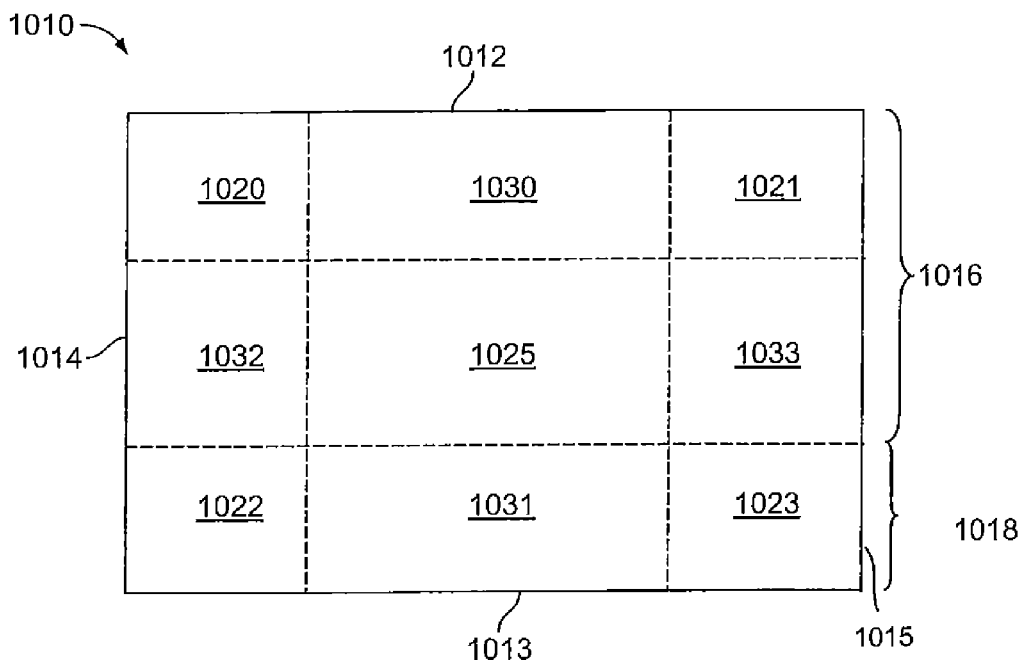
FIG. 10 illustrates alternative touch systems that may be implemented to utilize one or more projected capacitive touch screens formed in accordance with embodiments.

FIG. 10 illustrates alternative touch systems that may be implemented to utilize one or more projected capacitive touch screens formed in accordance with embodiments herein. FIG. 10 illustrates a touch system 1010 having top, bottom, left and right borders 1012-1015, respectively. In one embodiment, the touch system 1010 is formed by combining two different types of components, such as one type of component in region 1016 and a different type of component in region 1018. For example, the component in region 1016 may represent a projected capacitive touch screen formed in accordance with one of the embodiments discussed above in connection with FIGS. 1-9. While not illustrated, the region 1016 includes electrodes (e.g., as shown in FIGS. 3-5) provided on a substrate and organized into first and second sets of electrodes that are interlaced with one another in a non-overlapping pattern. At least a subset of the electrodes has an apex and a base and a non-uniform triangular shape that extends along a longitudinal axis between the apex and the base, where the non-uniform triangular shape is located within an acceleration zone along one of the edges.

The component in region 1018 may represent a different type of touch screen. For example, the region 1018 may include a touch screen that is formed based on another type of touch sensitive technology, such as surface acoustic wave, capacitive (non-projected), infrared, strain gauge, optical imaging, dispersive signal, acoustic pulse recognition, and the like. It may be desirable to utilize different types of touch sensitive technologies in combination in a touch system based on various factors such as the application, operating environment, user input instrument, information displayed, input requested from the user and the like. For example, in certain applications, the characteristics and performance of a projected capacitive touch screen may be desirable in a majority of the touch system (such as in region 1016), while the characteristics and performance of another touch sensitive technology are desirable in a smaller portion of the touch system (e.g., a stylus sensitive area to sign a name) (such as in region 1018). Alternatively, the region 1018 may not be touch sensitive at all, but instead may simply include a display area, a keyboard, and the like.

It should be recognized that the touch system 1010 may combine components in layouts that differ from regions 1016 and 1018. For example, corner regions 1020-1023 (as denoted in dashed lines) may be provided with one type of touch sensitive technology, while a remaining portion of the touch system utilizes a different touch sensitive technology. For example, the components in corner regions 1020-1023 may represent projected capacitive touch screens formed in accordance with one of the embodiments discussed above in connection with FIGS. 1-9. The component(s) in the remainder of the touch system 1010 (e.g., regions 1025 and 1030-1033) may be formed with a different type of touch technology.

As a further option, the entire touch system 1010 may be formed utilizing a plurality of projected capacitive touch screens. For example, the plurality of projected capacitive touch screens may be arranged adjacent one another in an array, such as a 3×4 array as denoted by the dashed lines separating regions 1020-1023, 1025, and 1030-1033. However, only a portion of the projected capacitive touch screens may implement electrodes with a non-uniform triangular shape in accordance with one of the embodiments discussed above in connection with FIGS. 1-9. For example, only a subset of the regions 1020-1023, 1025, and 1030-1033 may experience the deceleration effect discussed above. Hence, only the subset of the regions 1020-1023, 1025, and 1030-1033 may implement hardware acceleration through non-uniform triangularly shaped electrodes.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. This written description uses examples to disclose the invention, including the best mode, and also to enable any person skilled in the art to practice the invention, including making and using any devices or systems and performing any incorporated methods. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C.§112, sixth paragraph, unless and until such claim limitations expressly use the phrase "means for" followed by a statement of function void of further structure.

What is claimed is:

1. A projected capacitive touch screen, comprising:
a substrate that defines an active touch zone surrounded by edges, the active touch zone including a central active zone and an acceleration zone that is located proximate to, and extends along, at least one of the edges; and
electrodes provided on the substrate, the electrodes being organized into first and second sets of electrodes that are contained within a common plane on the substrate, the first set of electrodes being interlaced with the second set of electrodes in a non-overlapping pattern on the substrate, wherein at least a subset of the electrodes each has an apex and a base and a non-uniform triangular shape that extends along a longitudinal axis between the apex and the base, the subset of the electrodes being located such that at least a portion of the non-uniform triangular shape is located within the acceleration zone; and
wherein the non-uniform triangular shape and non-overlapping pattern provide edge acceleration to compensate for signal loss when a portion of a finger contact area moves beyond one of the edges outside the active touch zone.

2. The touch screen of claim 1, wherein the non-uniform triangular shape of at least one of the electrodes includes an electrode width that varies more rapidly near a perimeter of the active touch zone than a variation of the electrode width near a center of the active touch zone.

3. The touch screen of claim 1, wherein the electrodes within the subset of electrodes include an intermediate body segment located between the apex and base, and wherein the non-uniform triangular shape includes a first pitch proximate to the base and a different second pitch along the intermediate body segment, the pitch representing a rate of change in a width of the electrode per unit of distance along the longitudinal axis of the electrode.

4. The touch screen of claim 1 wherein the acceleration zone extends up to 20 mm from the corresponding edge.

5. The touch screen of claim 1, wherein the non-uniform triangular shape has at least one of i) an intra-electrode pitch change, and ii) a difference in widths between the electrodes that are interiorly located within the active touch zone and the electrodes that are laterally located relative to the active touch zone.

6. The touch screen of claim 1, wherein the apex includes at least one of a triangular contour, a multi-segment contour, a rounded contour with a concave end, and a rounded contour with a pointed end.

7. The touch screen of claim 1, wherein the non-uniform triangular shape includes a step change to a smaller area in a segment of the corresponding electrode proximate to the edge.

8. The touch screen of claim 1, the electrodes including a first subset of at least two of the electrodes extending along the acceleration zone proximate one of the edges, and a second subset of at least two of the electrodes extending through the central active zone, the electrodes in the first subset having a smaller electrode area than an electrode area of the electrodes in the second subset.

9. The touch screen of claim 1, wherein the active touch screen includes opposed acceleration zones located on opposite top and bottom sides of the central active area, the first and second sets of electrodes including electrodes that extend through the central active area such that the apexes and bases are located in the opposed acceleration zones.

10. The touch screen of claim 1, wherein the longitudinal axes of the electrodes are oriented to extend in a common direction as opposed lateral edges of the touch screen, each of the electrodes having an electrode area which is a function of a spacing of the electrode from the lateral edges.

11. The touch screen of claim 1, wherein the longitudinal axes of the electrodes are oriented to extend in a common direction as opposed lateral edges of the touch screen, each of the electrodes having an electrode area which is a function of a position of the electrode from the lateral edges.

12. A projected capacitive touch screen, comprising:
a substrate that defines an active touch zone surrounded by edges, the active touch zone including a central active zone and an acceleration zone that is located proximate to, and extends along, at least one of the edges; and
electrodes provided on the substrate, the electrodes being organized into first and second sets of electrodes that are contained within a common plane on the substrate, the first set of electrodes being interlaced with the second set of electrodes in a non-overlapping pattern on the substrate, wherein at least a subset of the electrodes each has opposed non-parallel first and second sides, the subset of the electrodes each having an apex segment, a base segment and an intermediate body segment therebetween, wherein the first side has a first pitch in the intermediate segment and a second pitch in at least one of the apex and base segments, the subset of the electrodes being located such that at least one of the apex and base segments is located within the acceleration zone;
wherein a non-uniform triangular shape of the electrodes and the non-overlapping pattern provide edge acceleration to compensate for signal loss when a portion of a finger contact area moves beyond one of the edges outside the active touch zone.

13. The touch screen of claim 12, wherein at least one of the electrodes includes an electrode width that varies more rapidly near a perimeter of the active touch zone than a variation of the electrode width near a center of the active touch zone.

14. The touch screen of claim 12, wherein the pitch represents a rate of change in a width of the electrode per unit of distance along a longitudinal axis of the electrode.

15. The touch screen of claim 12, wherein the acceleration zone extends up to 20 mm from the corresponding edge.

16. The touch screen of claim 12, wherein the electrodes that are interiorly located within the active touch zone have a different width than electrodes that are laterally located relative to the active touch zone.

17. The touch screen of claim 12, wherein the apex segment includes at least one of a triangular contour, a multi-segment contour, a rounded contour with a concave end, and a rounded contour with a pointed end.

18. The touch screen of claim 12, the electrodes including a first subset of at least two of the electrodes extending along the acceleration zone proximate one of the edges, and a second subset of at least two of the electrodes extending through the central active zone, the electrodes in the first subset having a smaller electrode area than an electrode area of the electrodes in the second subset.

19. An electronic device, comprising:
a processor, memory storing instructions to control operation of the processor, and a display for presenting information to a user, the display including a projected capacitive touch screen that comprises:
a substrate that defines an active touch zone surrounded by edges, the active touch zone including a central active zone and an acceleration zone that is located proximate to, and extends along, at least one of the edges;
electrodes provided on the substrate, the electrodes being organized into first and second sets of electrodes that are contained within a common plane on the substrate, the first set of electrodes being interlaced with the second set of electrodes in a non-overlapping pattern on the substrate, wherein at least a subset of the electrodes each has an apex and a base and a non-uniform triangular shape that extends along a longitudinal axis between the apex and the base, the subset of the electrodes being located such that at least a portion of the non-uniform triangular shape is located within the acceleration zone; wherein the non-uniform triangular shape and non-overlapping pattern provide edge acceleration to compensate for signal loss when a portion of a finger contact area moves beyond one of the edges outside the active touch zone.

20. The touch screen of claim 19, wherein the apex includes at least one of a triangular contour, a multi-segment contour, a rounded contour with a concave end, and a rounded contour with a pointed end.

* * * * *